(12) United States Patent
Folan et al.

(10) Patent No.: US 12,507,870 B2
(45) Date of Patent: Dec. 30, 2025

(54) DEVICES WITH AN ADJUSTABLE EFFECTIVE WORKING SHAFT LENGTH

(71) Applicant: Boston Scientific Scimed, Inc., Maple Grove, MN (US)

(72) Inventors: Martyn G Folan, Loughrea (IE); Louis McNern, Donegal (IE); Matthew Montague, Galway (IE)

(73) Assignee: Boston Scientific Scimed, Inc., Maple Grove, MN (US)

( * ) Notice: Subject to any disclaimer, the term of this patent is extended or adjusted under 35 U.S.C. 154(b) by 875 days.

(21) Appl. No.: 16/379,039

(22) Filed: Apr. 9, 2019

(65) Prior Publication Data

US 2019/0313888 A1    Oct. 17, 2019

Related U.S. Application Data

(60) Provisional application No. 62/655,979, filed on Apr. 11, 2018.

(51) Int. Cl.
*A61B 1/00* (2006.01)
*A61B 1/018* (2006.01)
(Continued)

(52) U.S. Cl.
CPC ...... *A61B 1/00131* (2013.01); *A61B 1/00087* (2013.01); *A61B 1/00133* (2013.01);
(Continued)

(58) Field of Classification Search
CPC ............ A61B 1/00087; A61B 1/00133; A61B 1/00137; A61B 1/0014; A61B 1/012; A61B 1/018; A61B 17/00234; A61B 17/0218; A61B 17/0469; A61B 17/12013; A61B 17/1285; A61B 17/29; A61B 17/320016; A61B 17/32002; A61B 17/320024; A61B 17/320028; A61B 17/320032;
(Continued)

(56) References Cited

U.S. PATENT DOCUMENTS 5,201,488 A    4/1993    Hadbavny
5,807,237 A    9/1998    Tindel
(Continued)

FOREIGN PATENT DOCUMENTS

CN    202842578 U    4/2013
JP    2001275947 A    10/2001
(Continued)

OTHER PUBLICATIONS

Author unknown, "Endoscopic Ultrasonography System SU-1, EG-580UT, EG-580UR", Specifications, Fujifilm Corp (2015) 6 pages.
(Continued)

*Primary Examiner* — Ryan N Henderson
(74) *Attorney, Agent, or Firm* — Seager, Tufte & Wickhem, LLP

(57) ABSTRACT

The present disclosure relates to the field of medical devices. In particular, the present disclosure relates to devices with a shaft having an effective working length that is adjustable relative to a connector of the device and/or a working channel of an endoscope, and methods for their use, such as devices and methods for delivery of a stent.

11 Claims, 8 Drawing Sheets

(51) Int. Cl.
*A61B 8/12* (2006.01)
*A61B 17/00* (2006.01)
*A61F 2/95* (2013.01)
*A61B 17/34* (2006.01)

(52) U.S. Cl.
CPC .......... *A61B 1/00147* (2013.01); *A61B 1/018* (2013.01); *A61B 8/12* (2013.01); *A61B 17/00234* (2013.01); *A61F 2/95* (2013.01); *A61B 2017/0034* (2013.01); *A61B 2017/3443* (2013.01); *A61B 2017/347* (2013.01)

(58) Field of Classification Search
CPC .......... A61B 2017/00292; A61B 2017/00296; A61B 2017/0034
See application file for complete search history.

(56) References Cited

U.S. PATENT DOCUMENTS

| | | | |
|---|---|---|---|
| 5,810,828 A | 9/1998 | Lightman et al. | |
| 6,132,402 A * | 10/2000 | Tessmann | A61M 5/344 |
| | | | 285/305 |
| 6,293,908 B1 * | 9/2001 | Fujikura | A61B 1/01 |
| | | | 600/114 |
| 6,520,954 B2 * | 2/2003 | Ouchi | A61B 10/0275 |
| | | | 606/1 |
| 6,745,065 B2 * | 6/2004 | Niwa | A61B 1/00147 |
| | | | 600/117 |
| 6,890,294 B2 * | 5/2005 | Niwa | A61B 1/00137 |
| | | | 600/153 |
| 7,727,144 B2 * | 6/2010 | Suzuki | A61B 17/29 |
| | | | 600/153 |
| 7,927,271 B2 * | 4/2011 | Dimitriou | A61B 1/00128 |
| | | | 600/153 |
| 8,162,958 B2 * | 4/2012 | Takahashi | A61B 17/064 |
| | | | 606/139 |
| 8,197,396 B2 * | 6/2012 | Hiraoka | A61B 10/06 |
| | | | 600/106 |
| 8,357,193 B2 | 1/2013 | Phan et al. | |
| 8,512,368 B2 * | 8/2013 | Sato | A61B 1/00137 |
| | | | 606/205 |
| 8,545,395 B2 * | 10/2013 | Akahoshi | A61B 17/2909 |
| | | | 600/114 |
| 8,828,026 B2 * | 9/2014 | Ishioka | A61B 17/068 |
| | | | 606/139 |
| 8,858,576 B2 * | 10/2014 | Takahashi | A61B 17/064 |
| | | | 606/151 |
| 8,905,920 B2 * | 12/2014 | Meloul | A61B 1/00137 |
| | | | 600/106 |
| 8,961,558 B2 * | 2/2015 | Hiraoka | A61B 1/00137 |
| | | | 606/208 |
| 8,968,210 B2 * | 3/2015 | Mugan | A61B 10/0266 |
| | | | 604/164.08 |
| 9,033,865 B2 * | 5/2015 | Suda | A61B 1/018 |
| | | | 600/125 |
| 9,089,261 B2 * | 7/2015 | Greenburg | A61B 1/012 |
| 9,155,526 B2 * | 10/2015 | Hiraoka | A61B 10/0233 |
| 9,332,973 B2 * | 5/2016 | McWeeney | A61B 10/04 |
| 9,381,041 B2 | 7/2016 | Brown et al. | |
| 2001/0004676 A1 * | 6/2001 | Ouchi | A61B 1/00133 |
| | | | 606/1 |
| 2003/0028096 A1 * | 2/2003 | Niwa | A61B 5/064 |
| | | | 600/424 |
| 2003/0195388 A1 * | 10/2003 | Niwa | A61B 1/00128 |
| | | | 600/117 |
| 2004/0225319 A1 | 11/2004 | Konyn et al. | |
| 2005/0182292 A1 * | 8/2005 | Suzuki | A61B 17/29 |
| | | | 600/154 |
| 2005/0228413 A1 * | 10/2005 | Binmoeller | A61B 17/064 |
| | | | 606/153 |
| 2007/0075003 A1 * | 4/2007 | Schmidt | F16L 37/12 |
| | | | 210/100 |
| 2007/0255311 A1 * | 11/2007 | Hiraoka | A61B 1/00137 |
| | | | 606/205 |
| 2007/0270640 A1 * | 11/2007 | Dimitriou | A61B 1/00128 |
| | | | 600/106 |
| 2007/0276180 A1 * | 11/2007 | Greenburg | A61B 90/57 |
| | | | 600/106 |
| 2008/0208214 A1 * | 8/2008 | Sato | A61B 17/1114 |
| | | | 606/139 |
| 2008/0242925 A1 * | 10/2008 | Suda | A61B 1/00133 |
| | | | 600/104 |
| 2009/0054773 A1 * | 2/2009 | Shizuka | A61B 18/1492 |
| | | | 606/33 |
| 2009/0062830 A1 * | 3/2009 | Hiraoka | A61B 10/0233 |
| | | | 606/185 |
| 2009/0069822 A1 * | 3/2009 | Takahashi | A61B 17/068 |
| | | | 606/139 |
| 2009/0088600 A1 * | 4/2009 | Meloul | A61B 1/2676 |
| | | | 600/154 |
| 2009/0209820 A1 * | 8/2009 | Tanaka | A61M 25/0147 |
| | | | 600/149 |
| 2010/0010508 A1 * | 1/2010 | Takahashi | A61B 17/1114 |
| | | | 606/151 |
| 2010/0010509 A1 * | 1/2010 | Ishioka | A61B 17/11 |
| | | | 606/139 |
| 2010/0010520 A1 * | 1/2010 | Takahashi | A61B 17/064 |
| | | | 606/157 |
| 2010/0022826 A1 * | 1/2010 | Akahoshi | A61B 17/2909 |
| | | | 600/104 |
| 2010/0121218 A1 * | 5/2010 | Mugan | A61B 10/0266 |
| | | | 600/567 |
| 2010/0228084 A1 * | 9/2010 | Sato | A61B 1/00128 |
| | | | 600/106 |
| 2011/0028972 A1 | 2/2011 | Khanna | |
| 2012/0029278 A1 * | 2/2012 | Sato | A61B 1/018 |
| | | | 600/104 |
| 2012/0116248 A1 * | 5/2012 | Mcweeney | A61B 10/0233 |
| | | | 600/567 |
| 2012/0223037 A1 | 9/2012 | Witschen | |
| 2016/0045100 A1 * | 2/2016 | Eto | A61B 1/00087 |
| | | | 600/106 |
| 2017/0354404 A1 | 12/2017 | Chu | |

FOREIGN PATENT DOCUMENTS

| | | |
|---|---|---|
| JP | 2001321328 A | 11/2001 |
| JP | 3156465 U | 1/2010 |
| JP | 2010264064 A | 11/2010 |
| JP | 2017164519 A | 9/2017 |
| WO | 2010138277 A1 | 12/2010 |

OTHER PUBLICATIONS

Author unknown, "Olympus Ultrasound Gastrovideoscope TGF-UC180J—Forward-Viewing Ultrasound Gastrovideoscope Creates Pioneering New Opportunities in EUS-guided Treatment", Specifications, Olympus Europa SE & Co. KG, (no date given), 3 pages.
Varadarajulu, S., et al., "Report on Emerging Technology—ASGE", Gastrointestinal Endoscopy, 74(1):12 pages (2011).
International Search Report and Written Opinion for application No. PCT/US2019/026518, mailed on Jul. 12, 2019, 11 pages.

\* cited by examiner

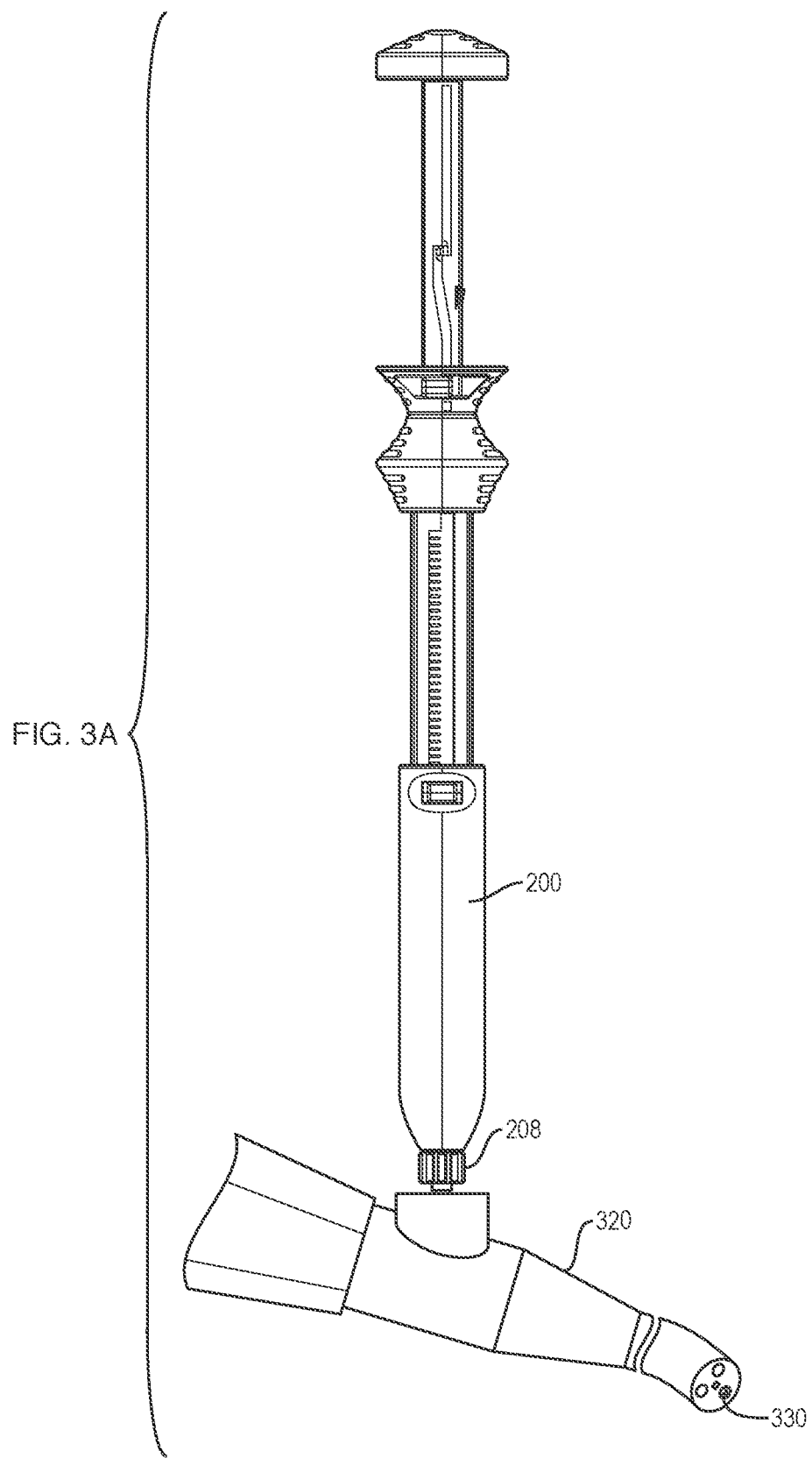

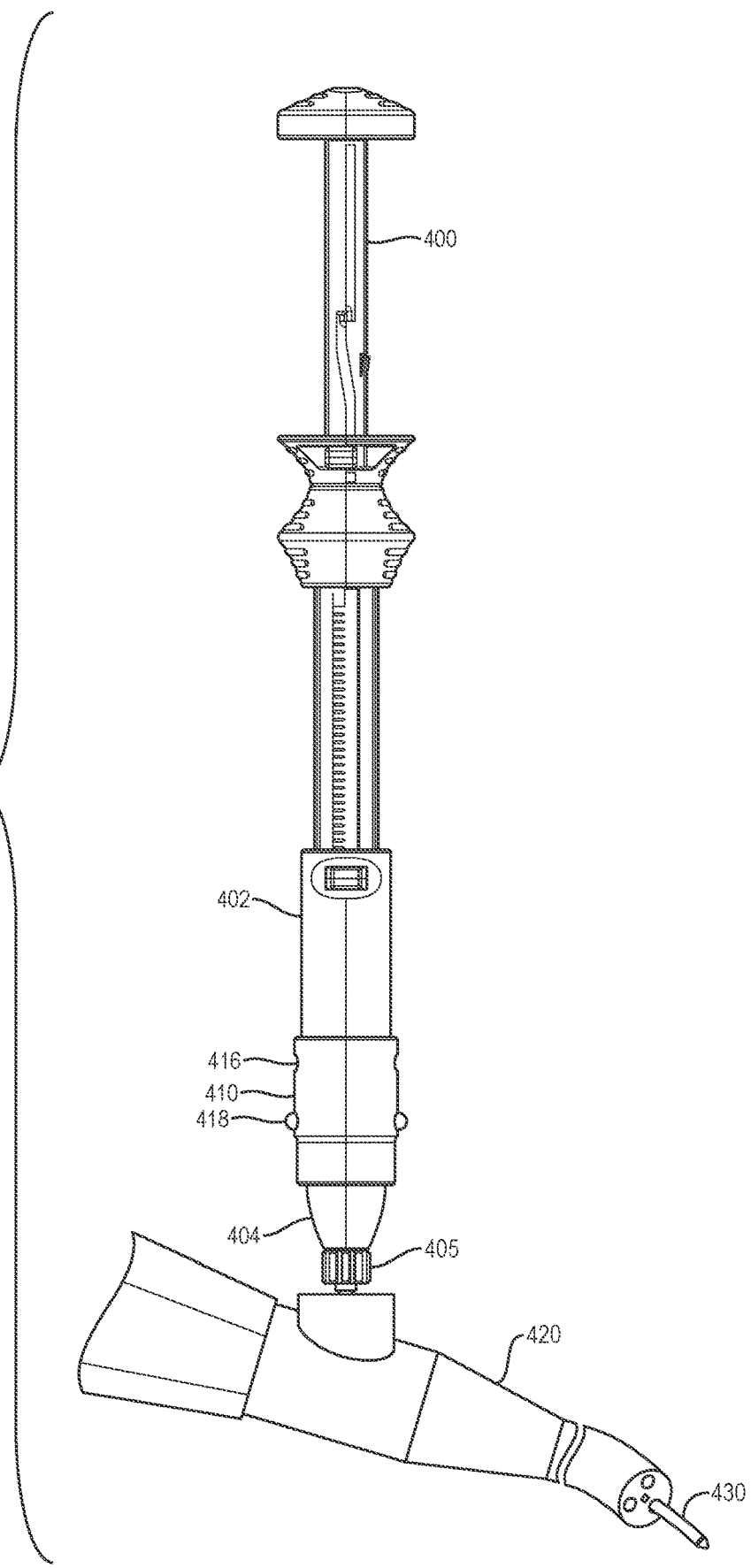

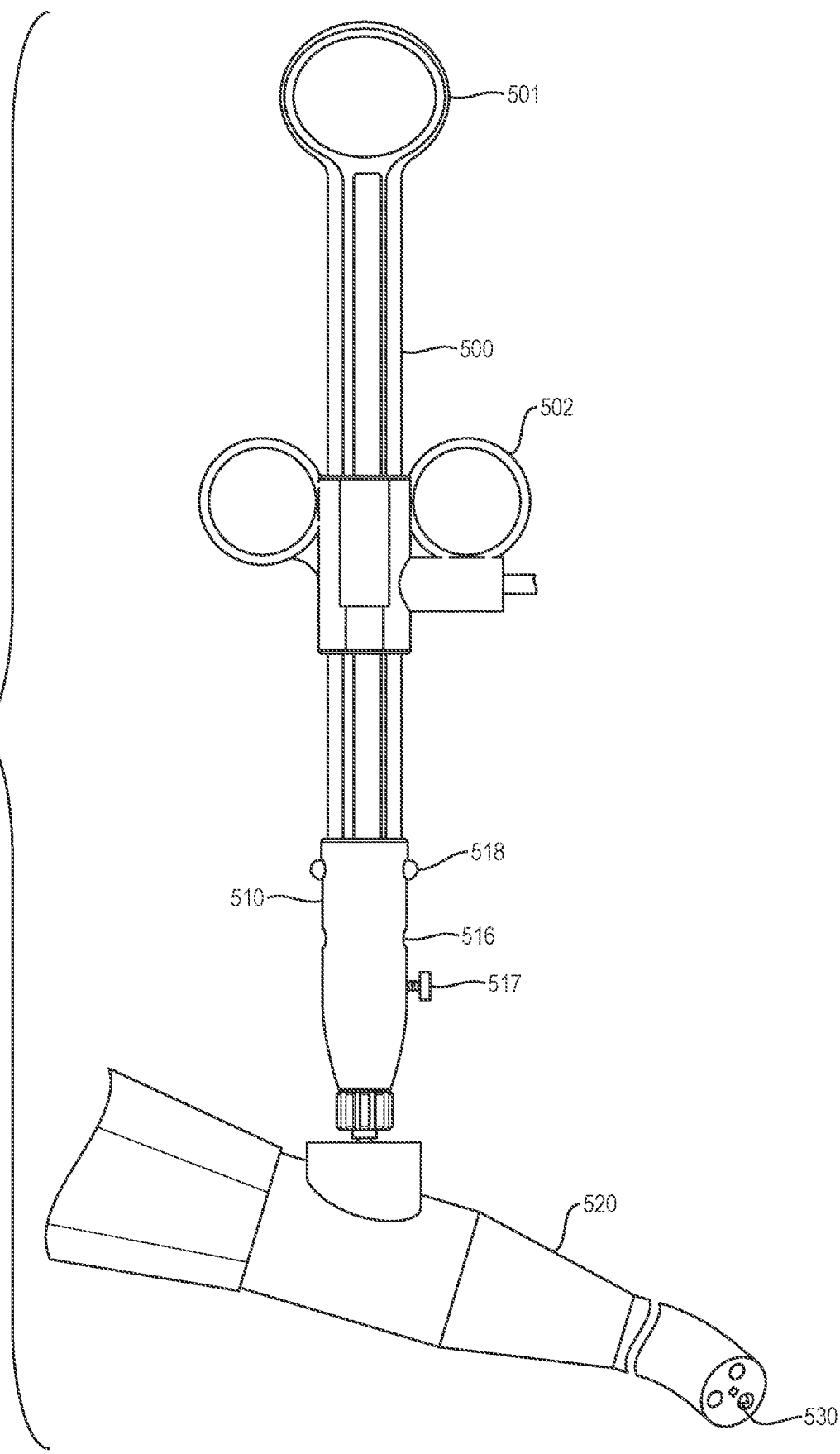

DEVICES WITH AN ADJUSTABLE EFFECTIVE WORKING SHAFT LENGTH

PRIORITY

This application claims the benefit of priority under 35 USC § 119 to U.S. Provisional Patent Application Ser. No. 62/655,979, filed Apr. 11, 2018, which is incorporated by reference herein in its entirety and for all purposes.

FIELD

The present disclosure relates to the field of medical devices. In particular, the present disclosure relates to devices with a shaft having an effective working length that is adjustable relative to a connector of the devices and/or a working channel of an endoscope, and methods for their use, such as devices and methods for delivery of a stent.

BACKGROUND

Medical devices may include predetermined lengths for parts (e.g., a shaft of a delivery catheter, or the like) to reach into certain treatment sites within a patient and/or to be compatible with a specific auxiliary medical device (e.g., an endoscope). Production of medical devices with predetermined shaft lengths may not work well with other patient treatment sites or with other auxiliary medical devices that they were not designed to be compatible with (e.g., other types of endoscopes or other patient body lumens). For example, a medical device may be attached to an endoscope that it was not designed to be compatible with, and a length of a shaft of the medical device (e.g., a delivery catheter) may extend too far distally out of a working channel of the endoscope, rendering the device and/or system not able to operate as intended, or inoperable entirely. For example, a distal tip of a catheter shaft that extends too far distally from the end of an echoendoscope may not be able to be imaged with ultrasound. Designing and producing multiple alternative medical devices with different architecture to be compatible with different auxiliary medical devices may entail undue additional development and inventory costs. Additionally, there may be a loss of marketing appeal for having to purchase different versions of the same medical device simply to be compatible with multiple auxiliary devices.

It may therefore be desirable to have devices and/or systems, and methods for their use, which are able to be compatible with different working channels of endoscopes, such as devices and systems that include a shaft having an effective working length that is adjustable relative to a connector of the devices and/or a working channel of the endoscopes. It is with these considerations in mind that the improvements of the present disclosure may be advantageous.

SUMMARY

The present disclosure in various embodiments may include devices with a shaft having an effective working length that is adjustable relative to a connector of the devices and/or a working channel of an endoscope, and methods for their use. A shaft may extend out of a distal end of the working channel a predetermined distance within a patient. The predetermined distance may be within a working range of an echoendoscope to display the treatment site to the user via ultrasound. A distal end length of a catheter that extends longer than this may be beyond the functioning range of an echoendoscope for the procedure, while an extended distal end length shorter than this may not allow, for example, proper insertion, placement, and delivery of the stent.

In one aspect, a device may include a tubular distal member including a lumen extending therethrough. A tubular extension member may include a proximal end, a distal end and a lumen extending therethrough, the distal end disposed about the distal member. A tubular proximal member may include a lumen extending therethrough. A shaft may extend distally from the tubular proximal member. The proximal member may be slidingly disposed within the proximal end of the extension member and may be adjustable in a telescoping fashion to a desired position that corresponds to an adjustable effective working length of the shaft. A connector may be at a distal end of the distal member. The connector may be configured to fluidly connect the lumens of the distal, proximal and extension member to a proximal end of a working channel of an endoscope. The shaft may extend through the lumen of the extension member and through the lumen of the distal member, and may be insertable through the working channel of the endoscope. The adjustable effective working length of the shaft may be such that the shaft is extendable beyond the distal end of the working channel a predetermined distance. The adjustable effective working length of the shaft may be a length of the shaft measured from the connector to a distal tip of the shaft. The device may include a locking assembly configured to fix the proximal member and the extension member with respect to each other at the desired position. The desired position may include at least one predetermined fixed position of the locking assembly. The locking assembly may include one or more protrusions about the proximal member and one or more apertures along the extension member. The protrusions and apertures may be alignable to fix the proximal member and the extension member with respect to each other at predetermined desired positions. The predetermined desired positions may correspond to effective working lengths of the shaft that are predetermined. The locking assembly may include a plurality of apertures that correspond to a plurality of desired positions, which in turn define a plurality of predetermined effective working lengths of the shaft. The one or more protrusions may include a button that is compressible to disengage the proximal member from the extension member.

In another aspect, a system may include an endoscope having a working channel. The system may include a device that may have a tubular distal member including a lumen extending therethrough. The device may include a tubular extension member including a proximal end, a distal end and a lumen extending therethrough, the distal end disposed about the distal member. The device may include a tubular proximal member including a lumen extending therethrough. A shaft may extend distally from the proximal member and may be receivable within the working channel. The proximal member may be slidingly disposed within the proximal end of the extension member and adjustable in a telescoping fashion to a desired position that corresponds to an adjustable effective working length of the shaft. A connector may be at a distal end of the distal member. The connector may be configured to fluidly connect the lumens of the distal, proximal and extension member to a proximal end of the endoscope. The adjustable effective working length of the shaft may be a length of the shaft from the connector to the distal tip of the shaft. The shaft may extend through the lumen of the extension member and through the lumen of the distal member. The shaft may be insertable through the working channel of the endoscope. The adjustable effective working length of the shaft may be such that the shaft is extendable beyond the distal end of the working channel a predetermined distance. The system may include a locking assembly configured to fix the proximal member and the extension member with respect to each other at the desired position. The desired position may include at least one predetermined fixed position of the locking assembly.

In another aspect, a method of treating a patient may include inserting a medical device into a patient through a working channel of an endoscope. The device may have a shaft extending distally along the working channel. The device may be adjusted in a telescoping fashion to a desired position that corresponds to an adjustable effective working length of the shaft, such that the shaft extends out of a distal end of the working channel a predetermined distance. The device may include a tubular distal member. The device may include a tubular extension member disposed about the distal member. The device may include a tubular proximal member connected to the shaft. The proximal member may be slidingly received in the extension member. The shaft may be translatable through the distal member. The device may include a connector, wherein the connector is attachable to the working channel to fix movement of the distal member with respect to the endoscope. The device may be locked at the desired position.

BRIEF DESCRIPTION OF THE DRAWINGS

Non-limiting embodiments of the present disclosure are described by way of example with reference to the accompanying figures, which are schematic and not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures:

FIG. 3A illustrates a front view of a device, connected to an endoscope, in a position that corresponds to an adjustable length of the device, in accordance with an embodiment of the present disclosure.

FIG. 4A illustrates a front view of the device of FIGS. 3A and 3B, connected to an endoscope, in a different position that corresponds to an adjustable length of the device, in accordance with an embodiment of the present disclosure.

FIG. 5 illustrates a front view of a device connected to an endoscope, in accordance with an embodiment of the present disclosure.

DETAILED DESCRIPTION

Figure 1:
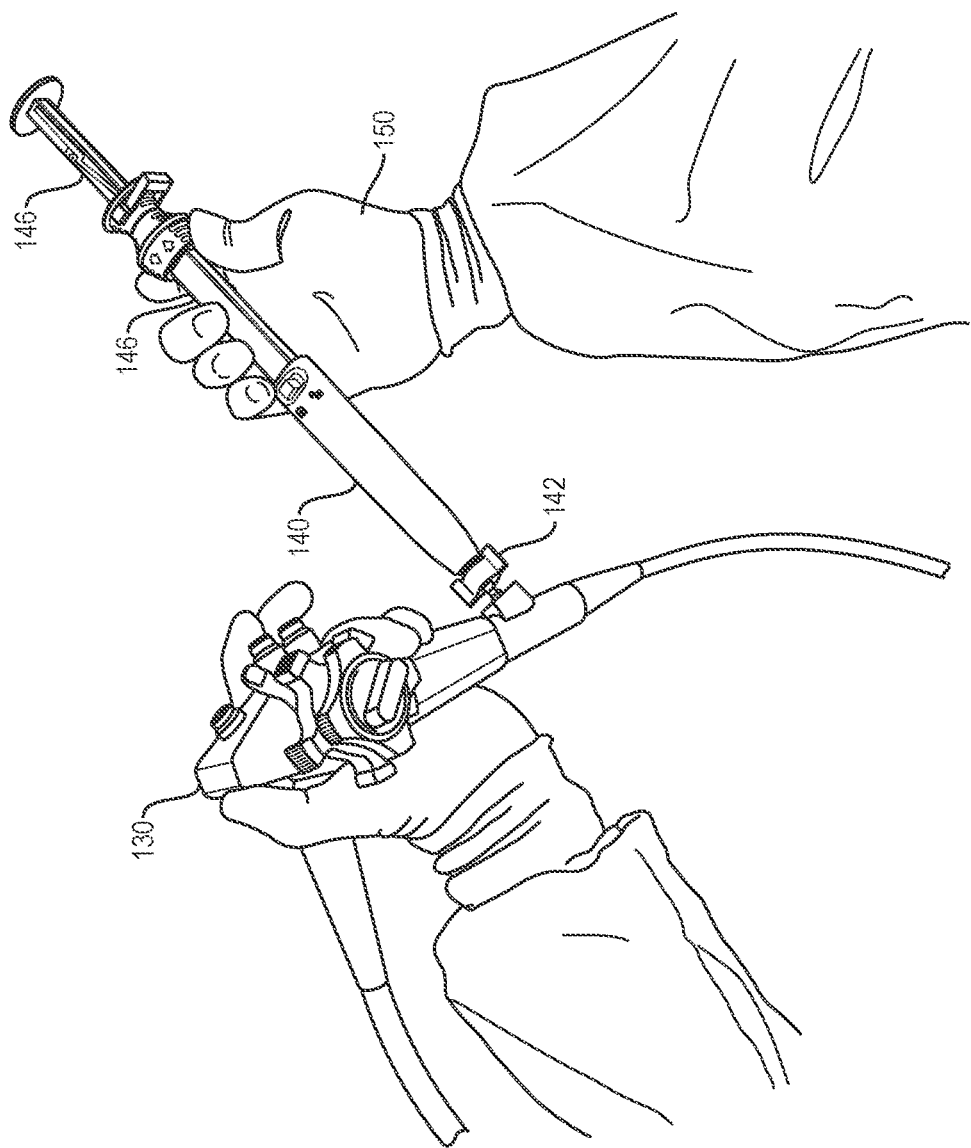
FIG. 1 illustrates an example of a user operating a device with a fixed length connected to an endoscope.

The present disclosure is not limited to the particular embodiments described. The terminology used herein is for the purpose of describing particular embodiments only, and is not intended to be limiting. Unless otherwise defined, all technical terms used herein have the same meaning as commonly understood by one of ordinary skill in the art to which the disclosure belongs.

As used herein, the singular forms "a," "an," and "the" are intended to include the plural forms as well, unless the context clearly indicates otherwise. It will be further understood that the terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof.

As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise.

As used herein, the term "distal" refers to the end farthest away from the medical professional when introducing a device into a patient, while the term "proximal" refers to the end closest to the medical professional when introducing a device into a patient.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g. 1 to 5 includes 1, 1.5, 2, 2.75, 3, 3.80, 4, and 5).

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

Embodiments of the present disclosure include devices and systems, and methods for their use, which provide an adjustable effective working length of a shaft of the devices with respect to a connector of the devices and/or with respect to a working channel of different endoscopes. Embodiments of medical devices (e.g., a catheter) that may be designed to extend to different treatment sites of a patient and/or to be compatible with different auxiliary medical devices (e.g., endoscopes) are described here.

Although endoscopes are referenced throughout the disclosure, medical devices of the present disclosure having an adjustable effective working length shaft may be useful with other kinds of auxiliary medical devices that have a "working channel" with a given length through which the medical device must extend and be compatible with.

Using an echoendoscope, as an example, a delivery catheter may be used for delivering a self-expanding drainage stent. The stent delivery device may be designed to connect to and work with an echoendoscope. Placement of a drainage stent within the body may be performed by insertion of a catheter carrying the stent under ultrasound guidance through the wall of a first body lumen (e.g., gastrointestinal tract) into an adjacent lumen (e.g., pseudocyst) and deployment of a distal retention member of the stent. The catheter may then be retracted and a proximal retention member deployed within the gastrointestinal tract (e.g., the stomach). Such an ultrasonic procedure may be performed using an echoendoscope in which a shaft of the delivery device is inserted through the echoendoscope. The working channel of an echoendoscope typically has a specific length, e.g., about 125 cm to about 130 cm, and a delivery catheter or device will typically extend through the length of the working channel with a shaft length of about 137 cm to about 138 cm, such that about 7.5 cm to about 8.5 cm of a distal end of the catheter will extend out of a distal end of the working channel a predetermined distance within the patient. The predetermined distance in this example may be within the working range of the echoendoscope to display the treatment site, including the catheter tip and stent, to the user via ultrasound. A distal end length of the catheter that extends longer than this working range may be beyond the functioning range of the echoendoscope for the procedure, while a distal end length that extends shorter than this working range may not allow for proper insertion, placement, and delivery of the stent.

With reference to FIG. 1, an example of a device and echoendoscope in accordance with the above description for delivery of a drainage stent is illustrated. The device 140 is connected to an echoendoscope 130 for operation by a user 150. The device 140 is connected to the echoendoscope 130 via a connector 142 that is a luer lock fitting, causing the device 140 to be in a locked position with respect to the echoendoscope 130. The user 150 may operate the echoendoscope 130 with one hand while operating the device 140 with the other hand. A shaft of the device 140 extends distally from the handle of the device 140 through a working channel of the echoendoscope 130 and extends from a distal end of the echoendoscope 130 a predetermined distance. The device 140 is in the locked position with the echoendoscope 130 and has a set shaft length such that the predetermined distance does not vary in a proximal or distal direction through movement of the device 140 with respect to the echoendoscope by the user. The handles 146 of the device 140 may be actuated in sequence during a procedure to deliver a stent while visualizing the distal tip of the shaft of the device with the echoendoscope.

A medical professional may desire to use a medical device, such as the device of FIG. 1 designed for a particular auxiliary medical device (e.g., an echoendoscope) having a given working channel length, with different auxiliary medical devices (e.g., a direct imaging endoscope or a different brand or configuration of an endoscope) having different working channel lengths. Should a user connect the device to a different endoscope, the functioning parts of the device (e.g., a length of the catheter shaft) may fail the needs of the procedure. For example, a working length of a shaft of a medical device, measured from a connector of the device to the distal tip of the shaft (e.g., a luer-lock connector to connect a device to the proximal end of a working channel after having been inserted through the scope), which may be "effective" with one length of endoscope, may not be effective with different lengths of the working channels of various other endoscopes. This may particularly be the case when the entirety of the catheter may not be moved with respect to the scope to change the distance the shaft extends beyond the endoscope, such as when it may be necessary or desirable for the medical device to be locked to the endoscope, e.g., so that it is capable of being manipulated along with the scope by a single hand of the user, or so that the medical device cannot be partially or inadvertently withdrawn or extended from the endoscope.

Figure 2A:
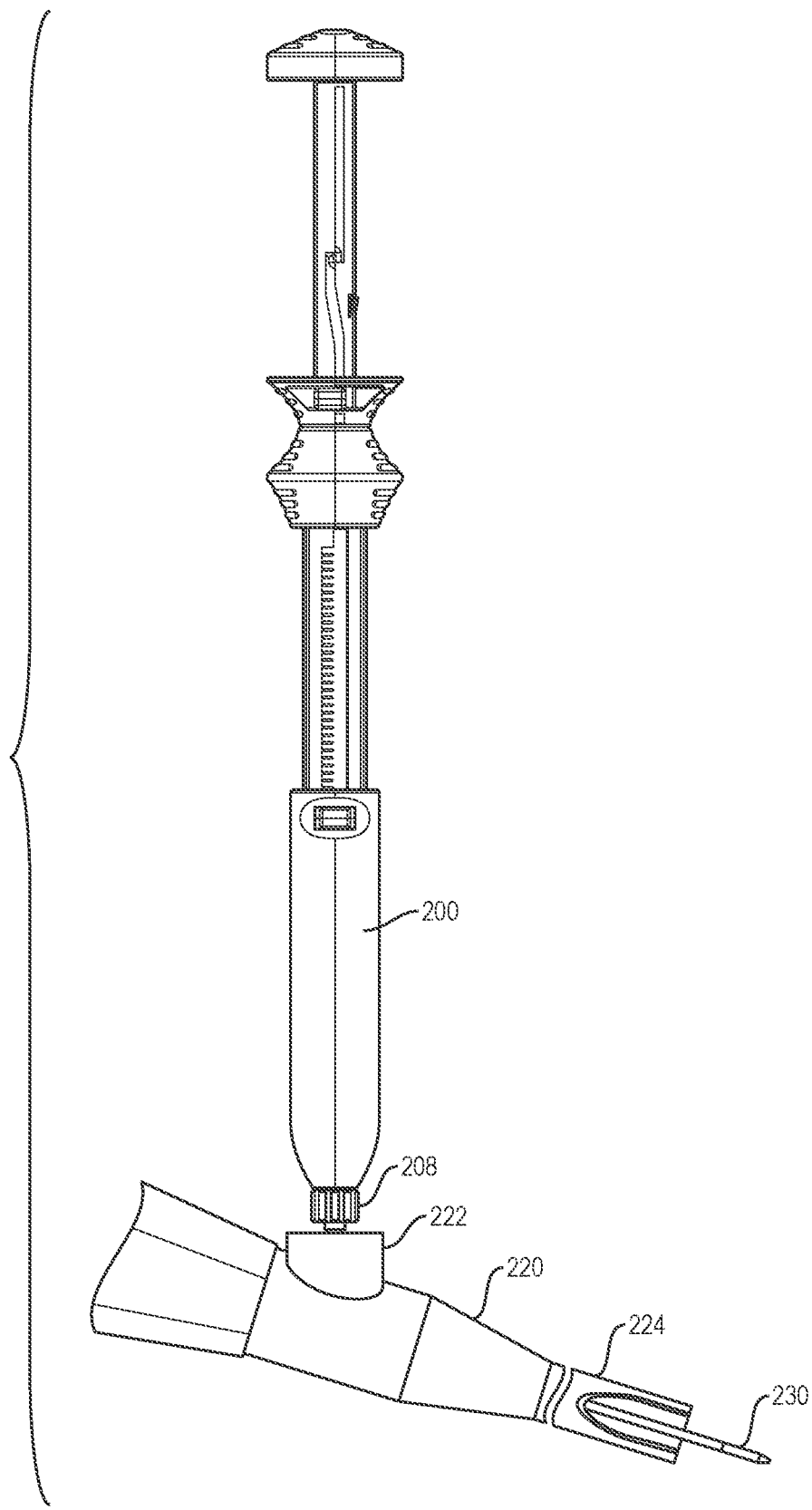
FIG. 2A illustrates a device connected to an endoscope.
Figure 2B:
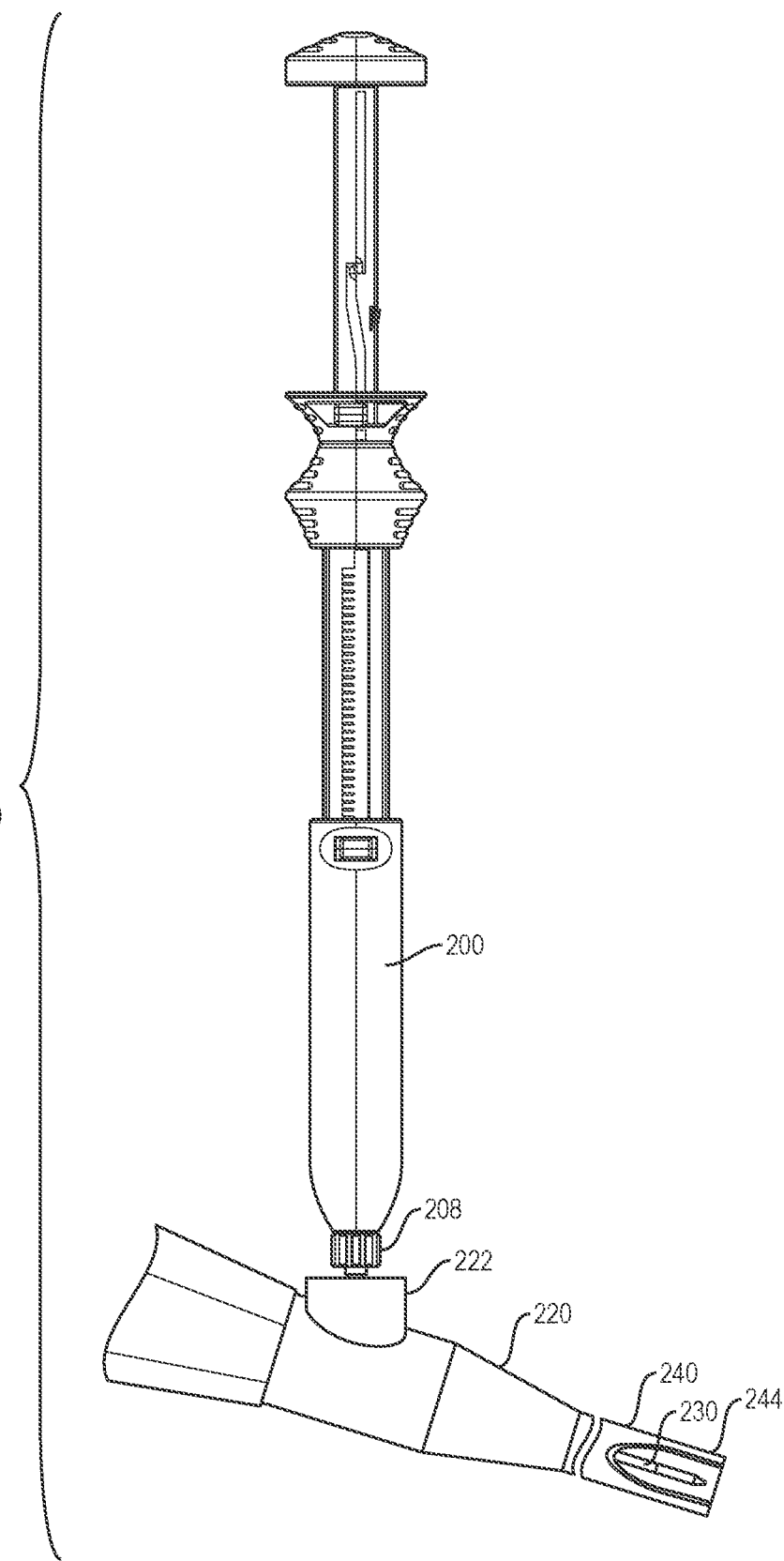
FIG. 2B illustrates the device of FIG. 2A connected to a different endoscope.

With reference to FIG. 2A, a medical device and an endoscope are illustrated, which includes an endoscope 220 having a working channel through the endoscope 220 for devices to be passed through. An exemplary stent delivery device 200, shown here as an AXIOS™ device manufactured by Boston Scientific Corporation, includes a distal end with a shaft 230 extending distally therefrom. The shaft 230 is receivable within the working channel, with the connector 208 of the device 200 connected to the proximal end 222 of the endoscope 220. The endoscope 220 is compatible with the delivery device 200, with the shaft 230 able to extend a predetermined distance distally from the distal end 224 of the endoscope 220. With reference to FIG. 2B, the same device 200 of FIG. 2A is connected to a different endoscope 240 having a longer working channel. The endoscope 220 is compatible with the delivery device 200, but the shaft 230 is not long enough to extend a similar predetermined distance distally from the distal end 244 of the endoscope 240, such as in FIG. 2A.

Figure 3B:
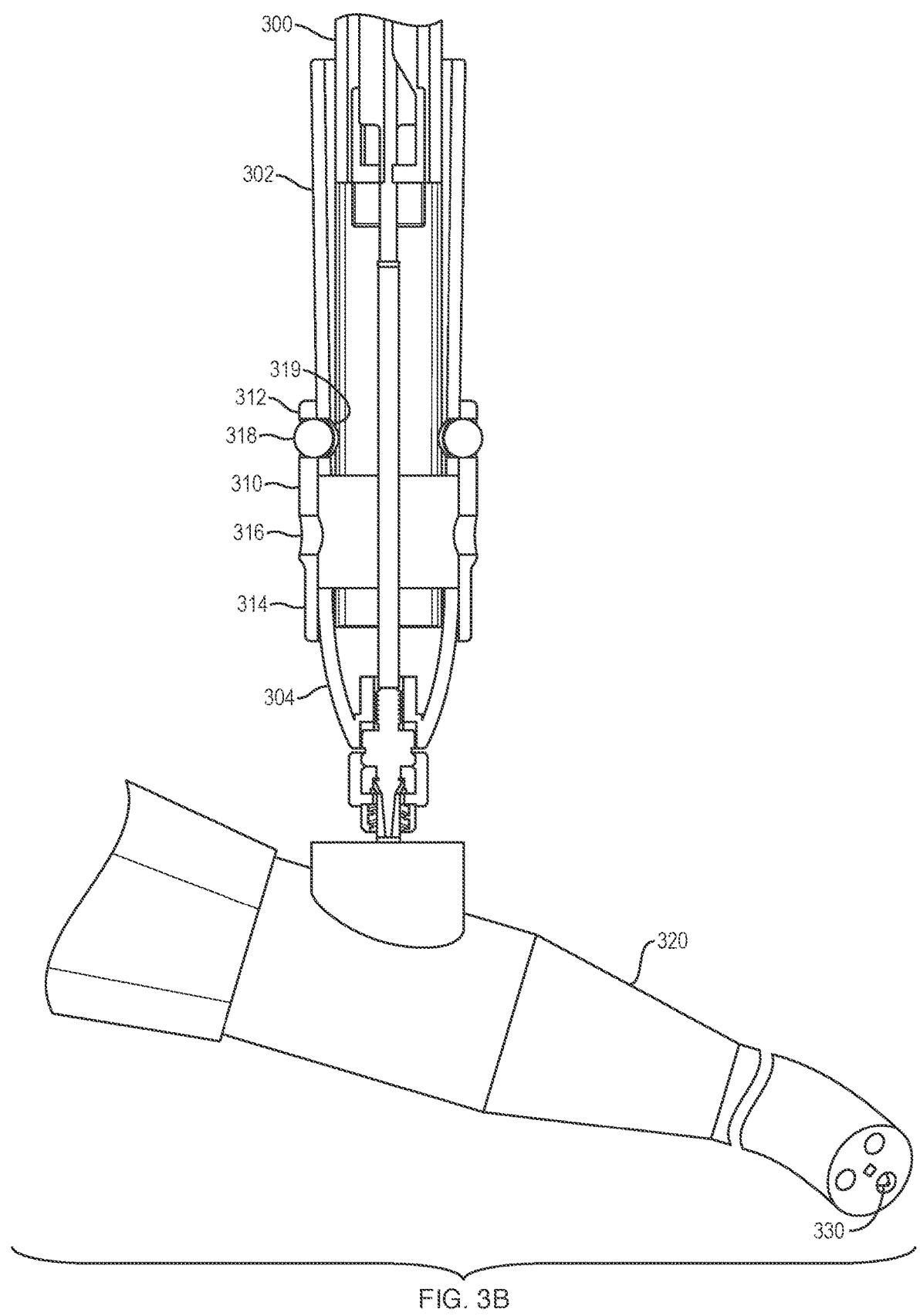
FIG. 3B illustrates a front cross-sectional view of the device of FIG. 3A.

FIGS. 3A and 3B illustrate an embodiment of the present disclosure, which includes a device, and a system for a device including an endoscope, having the capability for adjusting an effective working length of a shaft of the medical device to various working channels having different lengths. The system includes an endoscope 320 inserted into a patient and having a working channel through the endoscope 320 for devices to be passed through. The device 300 includes a tubular distal member 304 including a lumen extending therethrough. The device also has a tubular extension member 310 having a proximal end 312, a distal end 314, and a lumen extending therethrough. The distal end 314 is disposed about the distal member 304. The device has a tubular proximal member 302 that includes a lumen extending therethrough. The tubular proximal member 302 is coaxial with the tubular distal member 304. The medical device 300 includes a shaft 330 extending distally from the tubular proximal member 302 and through the distal member 304. The shaft 330 is insertable through the working channel of the endoscope 320. A connector 308 disposed at a distal end of the distal member 304 is configured to connect to a proximal end of the endoscope 320. The proximal member 302 is slidingly disposed within the proximal end 312 of the extension member 310, and is adjustable relative to the extension member 310 in a telescoping fashion, such that the proximal member 302 may be slid to a desired position that corresponds to an adjustable working length of the shaft 330. The device in FIGS. 3A and 3B is shown with a locking assembly, which includes protrusions 318, apertures 316, and springs 319. The protrusions 318 and springs 319 are arranged about the proximal member 302 in a plane that is perpendicular to the longitudinal axis of the device 300, while the apertures are arranged along the extension member 310. The protrusions 318 and apertures 316 of the locking assembly are alignable to fix the proximal member 302 and the extension member 310 with respect to each other at predetermined desired positions. The device 300 is illustrated in a desired locked position with the protrusions 318 extending out of the apertures 316, and a gap between the distal member 304 and the proximal member 302. However, the shaft 330 extending through the endoscope 320 does not extend distally beyond the distal end of the endoscope 320. The position of the tip of the shaft 330 within the endoscope 320 is not visible by a user through the endoscope 320 and may not be functional within a patient.

Figure 4B:
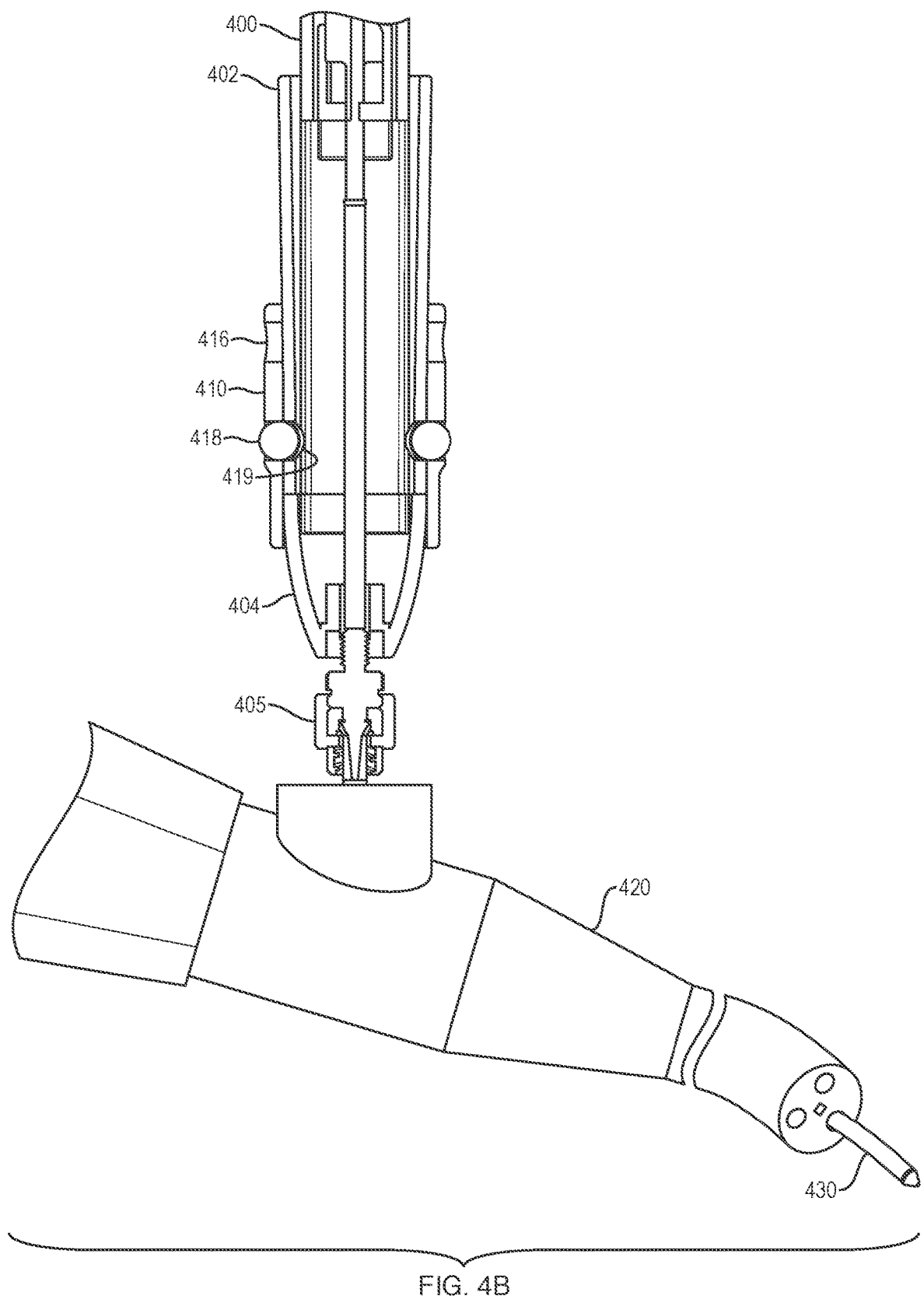
FIG. 4B illustrates a front cross-sectional view of the device of FIG. 4A.

FIGS. 4A and 4B illustrate the system of FIGS. 3A and 3B with the distal member 404 of device 400 connected to the endoscope 420 via the connector 408. The extension member is shown in a desired position different than that of the desired position of FIGS. 3A and 3B. The protrusions 418 of the locking assembly have been compressed into the apertures 416 of the extension member 410, such that the proximal member 402 of the device 400 could slide distally with respect to the extension member 410 and the distal member 404, taking up the gap between the distal member 404 and the proximal member 402 and extending the effective length of shaft 430 between the connector and the distal tip of the shaft 430. The locking assembly works by compressing protrusions 418 against the springs 419 into the extension member 410, into and clear of the inner surface of the lumen of the extension member, and within the proximal member 402. The proximal member 402 may then be slid such that the protrusions 418 engage another set of apertures 416, corresponding to the different desired position. As can be seen in FIGS. 4A and 4B, the proximal member 402 has been slid distally relative to the distal member 404 such that the protrusions 418 of the locking assembly are aligned with a different set of apertures 416 than that of FIGS. 3A and 3B, into a different desired position. The desired position of FIGS. 4A and 4B distally advances the shaft 430 out of the distal end of the working channel of the endoscope 420 a predetermined distance. The shaft 430 is slidable relative to the luer lock and connector 405. The device may be moved from the position in FIGS. 3A and 3B to the position of FIGS. 4A and 4B by moving the protrusions 418, the proximal member 402, and the shaft 430 distally. An effective working length of the shaft 330 and 430 has been adjusted between FIGS. 3A-3B and 4A-4B. The effective working length of the shaft 430, measured from the connector 405 to the distal tip of the shaft 430, has increased by extending the shaft 430 distally a distance equivalent to the gap space between the sets of apertures 416, allowing the distal tip to extend beyond the distal end of the working channel the predetermined desired distance. The shaft 430 in this position allows for visualization and operation of the distal end of the shaft 430.

With reference to FIG. 5, an embodiment of a system for adjusting an effective working length of a shaft to a working channel according to the present disclosure is illustrated, which includes a device 500 having a first handle 501 and a second handle 502 that may be manipulated by a user's fingers and/or thumb. The device 500 includes a distal member 510 that is connectable to an endoscope 520. An end effector or delivery mechanism (e.g., for delivering a stent) at the end of shaft 530 may be articulated by moving the second handle 502 with respect to the first handle 501 (e.g., pulling or pushing the second handle 502). The first handle 501, as the proximal member, may slide with respect to the distal member 510 by unlocking the first handle 501 from the distal member 510, e.g., by compressing the protrusions 518 into and clear of the inner surface of the lumen of the distal member 510. Additionally, or in the alternative, a knobbed screw 517 may be loosened and tightened, to respectively unlock and lock, the first handle 501 with respect to the distal member 510, so long as the protrusions are not engaged with the apertures 516. A user may tighten the knobbed screw 517 such that it engages and locks the distal member 510 with respect to the first handle 501. The knobbed screw 517 has no predetermined locked position (i.e., unlike the apertures 516 for the protrusions 518), providing more resolution for adjusting the effective working length compared to the protrusions 518 and apertures 516. The device 500 may have apertures 516 for predetermined locked positions for specific scopes, but a user could adjust and lock the working length of the shaft 530 for the working channel of scopes that are of a different length than that provided by the preset apertures 516 by instead using the knobbed screw 517 to adjust and fix the device 500 in a desired position that corresponds to a custom effective working length.

In various embodiments, a locking assembly includes a protrusion (e.g., a compressible button, a detent, or the like) that corresponds to preset apertures in the device. The protrusion can be compressed radially such that it completely enters and clears the inner surface of the lumen of a part of the device such as the extension member, proximal member, and/or distal member. The compressed protrusion disengages at least one member of the device from another, allowing one or more of the members and the protrusion to slide with respect to one or more other members, adjusting the working length of the shaft. Adjusting the effective working length of the device may change the predetermined distance of a shaft extending from a distal end of a working channel of an endoscope. In some embodiments, the locking assembly may include numerous preset apertures that correspond to numerous desired positions. The numerous positions of the locking assembly may define multiple adjustable lengths of the effective working length and/or the predetermined distances of the shaft. The apertures and desired positions may correspond to known lengths required for use with an assortment of auxiliary devices, such as endoscopes having different lengths of working channels. Each aperture, or set of apertures, may correspond to a type of endoscope. The protrusion(s) may engage the aperture(s), corresponding to the endoscope being used, in order to achieve the appropriate adjustable effective working length of the shaft. The effective working length of the shaft may be such that the shaft extends a predetermined length from the distal end of the working channel of the endoscope. For example, three sets of apertures may correspond to three predetermined fixed positions of the extension and proximal members of a device, which in turn correspond to three predetermined effective working shaft lengths of the device that are compatible with corresponding working channels of endoscopes, or working channels of other auxiliary devices for use with devices of the present disclosure. Visual indicators, such as markings, may be on the members that correspond to the desired positions. As an alternative to a locking assembly with protrusions and apertures, in other embodiments, one or more of the distal, extension and proximal members may include fasteners that may have a first element on one member and a second element on another member configured to mate with each other.

In various embodiments, described here or otherwise within the scope of the present disclosure, the predetermined distance of the shaft from the distal end of the endoscope may be in the range of about 7.5 cm to about 8.5 cm. The adjustable effective working length of the device may be a minimum of about 0 cm, and a maximum of about 2 cm. A lumen of an extension member may have a diameter that substantially matches an outer diameter of a proximal member and/or distal member.

In various embodiments, described here or otherwise within the scope of the present disclosure, the extension member, proximal member, and distal member may comprise various polymer and/or metallic materials. Materials may include aluminum, polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), Marlex® high-density polyethylene, Marlex® low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, and/or polyvinylidene chloride (PVdC). Materials may be selected to withstand forces associated with advancement and withdrawal of medical devices and scopes within the patient.

In various embodiments, described here or otherwise within the scope of the present disclosure, the connector may be a male or female luer fitting. The connector may be at a distal end of a distal member and may be configured to fluidly connect the lumens of the distal, proximal and extension member to a proximal end of a working channel of an endoscope. The connector may include a rotating luer nut and/or a winded luer fitting. The connectors may removably connect and tighten to a variety of scopes and medical devices.

In various embodiments, described here or otherwise within the scope of the present disclosure, a method of treating a patient may include inserting a medical device through a working channel of an endoscope into the patient. The device may have a shaft extending distally along the working channel. The device may be adjusted in a telescoping fashion to a desired position that corresponds to an adjustable effective working length of the shaft, such that the shaft may extend out a distal end of the working channel a predetermined distance. The device may include a tubular distal member. The device may include a tubular extension member disposed about the distal member. The device may include a tubular proximal member connected to the shaft. The proximal member may be slidingly received in the extension member. The shaft may be translatable through the distal member. The device may include a connector. The connector may be attachable to the working channel to fix movement of the distal member. The device may be locked at the desired position.

All of the devices and/or methods disclosed and claimed herein can be made and executed without undue experimentation in light of the present disclosure. While the devices and methods of this disclosure have been described in terms of certain embodiments, it may be apparent to those of skill in the art that variations can be applied to the devices and/or methods and in the steps or in the sequence of steps of the methods described herein without departing from the concept, spirit and scope of the disclosure. All such similar substitutes and modifications apparent to those skilled in the art are deemed to be within the present disclosure.

What is claimed is:
1. A device, comprising:
   a tubular distal member including a lumen extending therethrough and a connector disposed at a distal end of the tubular distal member, the connector configured to connect to a working channel of an endoscope;
   a tubular extension member including a proximal end, a distal end and a lumen extending therethrough, the distal end encircling a proximal portion of the tubular distal member, wherein a distal end of the tubular distal member extends past the distal end of the tubular extension member;
   a tubular proximal member including a lumen extending therethrough, a first handle and a second handle proximal of the first handle, the first handle configured to be slidably attached to the tubular proximal member to first move to a first position relative to the tubular proximal member to deploy a distal end of a tubular drainage stent and second move to a second position relative to the tubular proximal member to deploy a proximal end of the tubular drainage stent; and
   a shaft extending distally from the tubular proximal member;
   wherein the tubular proximal member is slidingly disposed within the proximal end of the tubular extension member and adjustable in a telescoping fashion to a desired position that corresponds to an adjustable effective working length of the shaft such that the adjustable effective working length of the shaft is within a working range of the endoscope.
2. The device of claim 1, wherein the shaft extends through the lumen of the tubular extension member and through the lumen of the tubular distal member, and is insertable through the working channel of the endoscope; and
   wherein the adjustable effective working length of the shaft is such that the shaft is extendable beyond the distal end of the working channel a predetermined distance.
3. The device of claim 2, wherein the adjustable effective working length of the shaft is a length of the shaft measured from the connector to a distal tip of the shaft.
4. The device of claim 1, further comprising a locking assembly configured to fix the tubular proximal member and the tubular extension member with respect to each other at the desired position.
5. The device of claim 4, wherein the desired position includes at least one predetermined fixed position of the locking assembly.

6. A system, comprising:
an endoscope having a working channel; and
a device, comprising:
a tubular distal member including a lumen extending therethrough and a connector disposed at a distal end of the tubular distal member, the connector configured to connect to a working channel of an endoscope;
a tubular extension member including a proximal end, a distal end and a lumen extending therethrough, the distal end encircling a proximal portion circumference of the tubular distal member, wherein a distal end of the tubular distal member extends past the distal end of the tubular extension member;
a tubular proximal member including a lumen extending therethrough,
a first handle and a second handle proximal of the first handle, the first handle configured to be slidably attached to the tubular proximal member to first move to a first position relative to the tubular proximal member to deploy a distal end of a tubular drainage stent and second move to a second position relative to the tubular proximal member to deploy a proximal end of the tubular drainage stent; and a shaft extending distally from the tubular proximal member and receivable within the working channel;
wherein the tubular proximal member is slidingly disposed within the proximal end of the tubular extension member and adjustable in a telescoping fashion to a desired position that corresponds to an adjustable effective working length of the shaft such that the adjustable effective working length of the shaft is within a working range of the endoscope.

7. The system of claim 6, wherein the adjustable effective working length of the shaft is a length of the shaft from the connector to a distal tip of the shaft.

8. The system of claim 6, wherein the shaft extends through the lumen of the tubular extension member and through the lumen of the tubular distal member, and is insertable through the working channel of the endoscope; and
wherein the adjustable effective working length of the shaft is such that the shaft is extendable beyond the distal end of the working channel a predetermined distance.

9. The system of claim 6, further comprising a locking assembly configured to fix the tubular proximal member and the tubular extension member with respect to each other at the desired position.

10. The system of claim 9, wherein the desired position includes at least one predetermined fixed position of the locking assembly.

11. The system of claim 6, wherein a proximal end of the tubular proximal member extends past the proximal end of the tubular extension member.

* * * * *